US011438952B2

(12) United States Patent
Yang

(10) Patent No.: US 11,438,952 B2
(45) Date of Patent: Sep. 6, 2022

(54) INFORMATION PROCESSING METHOD, HIGH-LAYER FUNCTIONAL ENTITY AND COMPUTER STORAGE MEDIUM

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 3 days.

(21) Appl. No.: 16/645,986

(22) PCT Filed: Sep. 12, 2017

(86) PCT No.: PCT/CN2017/101413
§ 371 (c)(1),
(2) Date: Mar. 10, 2020

(87) PCT Pub. No.: WO2019/051644
PCT Pub. Date: Mar. 21, 2019

(65) Prior Publication Data
US 2020/0281039 A1    Sep. 3, 2020

(51) Int. Cl.
*H04W 76/19*  (2018.01)
*H04W 16/28*  (2009.01)

(52) U.S. Cl.
CPC .......... *H04W 76/19* (2018.02); *H04W 16/28* (2013.01)

(58) Field of Classification Search
CPC ... H04W 76/19; H04W 16/28; H04W 72/046; H04W 56/00; H04W 72/085; H04W 76/18; H04W 24/00; H04B 17/309; H04B 17/17
See application file for complete search history.

(56) References Cited

U.S. PATENT DOCUMENTS

| 10,574,329 | B2* | 2/2020 | Nagaraja | H04B 17/309 |
| 10,659,137 | B2* | 5/2020 | Maattanen | H04W 16/28 |
| 10,674,383 | B2* | 6/2020 | Yu | H04B 7/0695 |
| 10,686,573 | B2* | 6/2020 | Jung | H04L 5/0023 |
| 11,005,701 | B2* | 5/2021 | da Silva | H04B 7/0619 |
| 2015/0271717 | A1* | 9/2015 | Moon | H04W 76/18 |
| | | | | 455/437 |

(Continued)

FOREIGN PATENT DOCUMENTS

| CN | 104113928 A | 10/2014 |
| CN | 107005858 A | 8/2017 |

(Continued)

OTHER PUBLICATIONS

First Office Action of the Russian application No. 2020112742, dated Oct. 22, 2020.

(Continued)

*Primary Examiner* — Habte Mered

(57) ABSTRACT

Provided are an information processing method, a high-layer function entity and a computer storage medium. The method includes that: a high-layer function entity receives a first preset amount of beam recovery failure indication information, and starts a first timer on the basis of the first preset amount of beam recovery failure indication information, the first preset amount being one or at least two.

14 Claims, 9 Drawing Sheets

(56) References Cited

U.S. PATENT DOCUMENTS

| | | | |
|---|---|---|---|
| 2016/0014646 A1* | 1/2016 | Yiu | H04W 36/0079 |
| | | | 370/331 |
| 2016/0353510 A1 | 12/2016 | Zhang et al. | |
| 2017/0231011 A1 | 8/2017 | Park et al. | |
| 2019/0036590 A1* | 1/2019 | Nagaraja | H04W 76/19 |
| 2019/0052342 A1* | 2/2019 | Maattanen | H04B 7/0695 |
| 2019/0174385 A1* | 6/2019 | Sang | H04W 36/0072 |
| 2019/0289573 A1* | 9/2019 | Hwang | H04W 74/0833 |
| 2020/0028603 A1* | 1/2020 | Wang | H04L 5/0051 |
| 2021/0105171 A1* | 4/2021 | Chen | H04W 72/04 |

FOREIGN PATENT DOCUMENTS

| | | |
|---|---|---|
| JP | 2002044732 A | 2/2002 |
| JP | 2010081412 A | 4/2010 |
| RU | 2538294 C2 | 1/2015 |
| WO | 2010052519 A1 | 5/2010 |
| WO | 2017135803 A1 | 8/2017 |

OTHER PUBLICATIONS

Notice of Allowance of the Russian application No. 2020112742, dated Dec. 16, 2020.
Vivo. "Seam Recovery Based on NR-PDCCH and NR-PDSCH" 3GPP TSG RAN WG1 Meeting #89, R1-1707245, Apr. 19, 2017 (Apr. 19, 2017). sections 2 and 4.
CMCC. "Relationship between RLF and Beam Recovery" 3GPP TSG RAN WG1 Meeting #90, R1-1713838, Aug. 25, 2017 (Aug. 25, 2017), sections 1-5.
Huawei et al: "RLM and Beam Failure Recovery Procedure", 3GPP Draft; R1-1715391, 3rd Generation Partnership Project (3GPP), vol. RAN WG1, No. Nagoya, Japan; Sep. 18, 2017-Sep. 21, 2017 Sep. 9, 2017 (Sep. 9, 2017), XP051328956, Retrieved from the Internet: URL:http://www.3gpp.org/ftp/tsg_ran/WG1_RL1/TSGR1_AH/NR_AH_1709/Docs/ [retrieved on Sep. 9, 2017] * section 3; figure 1 *.
Vivo: "RLF with beam recovery", 3GPP Draft; R2-1704580_RLF With Beam Recovery. 3rd Generation Partnership Project (3GPP), vol. RAN WG2, No. Hangzhou, China; May 15, 2017-May 19, 2017 May 6, 2017 (May 6, 2017), XP051264472, Retrieved from the Internet: URL:http://www.3gpp.org/ftp/tsg_ran/WG2_RL2/TSCR2_98/Docs/ [retrieved on May 6, 2017] * section 2.1, third paragraph.
International Search Report in the international application No. PCT/CN2017/101413, dated May 29, 2016.
Supplementary International Search Report in the International application No. PCT/CN2017/101413, dated Dec. 2, 2019.
Intel Corporation, "Beam failure and radio link failure handlings", 3GPP TSG-RAN WG2 Meeting #99 R2-1708313 Berlin, Germany, Aug. 21-25, 2017.
English translation of the Written Opinion of the International Search Authority in the international application No. PCT/CN2017/101413, dated May 29, 2018.
First Office Action of the European application No. 17924958.6, dated Feb. 24, 2021.
First Office Action of the Chinese application No. 202010067387.8, dated Apr. 28, 2021.
Office Action of the Indian application No. 202017015172, dated Jun. 30, 2021.
First Office Action of the Korean application No. 10-2020-7007173, dated May 18, 2021.
First Office Action of the Japanese application No. 2020-514223, dated Jul. 2, 2021.
First Office Action of the Canadian application No. 3074881, dated May 5, 2021.
Second Office Action of the European application No. 17924958.6, dated Aug. 31, 2021.
Written Opinion of the Singaporean application No. 11202002143S, dated Oct. 22, 2021.
Second Office Action of the Japanese application No. 2020-514223, dated Oct. 29, 2021.
Second Office Action of the Korean application No. 10-2020-7007173, dated Nov. 27, 2021.
Second Office Action of the Canadian application No. 3074881, dated Feb. 25, 2022.
Notice of Rejection of the Singaporean application No. 11202002143S, dated Apr. 6, 2022.

* cited by examiner

INFORMATION PROCESSING METHOD, HIGH-LAYER FUNCTIONAL ENTITY AND COMPUTER STORAGE MEDIUM

TECHNICAL FIELD

The disclosure relates to a wireless communication technology, and particularly to an information processing method, a high-layer function entity and a computer storage medium.

BACKGROUND

With the discussions about a 5th-Generation (5G) system, the concept of beam have been introduced into the 5G system, and the flows of beam recovery and beam recovery failure are introduced into a physical layer. For how to determine a radio link state on the basis of a beam recovery failure, there is yet no effective solution in a conventional art.

SUMMARY

In order to solve the existing technical problem, embodiments of the disclosure provide an information processing method and device, and a computer storage medium.

To this end, the technical solutions of the embodiments of the disclosure are implemented as follows.

The embodiments of the disclosure provide an information processing method, which may include the following operation:

a high-layer function entity receives a first preset amount of beam recovery failure indication information, and starts a first timer on the basis of the first preset amount of beam recovery failure indication information, the first preset amount being one or at least two.

In an embodiment, the method may further include the following operation:

the high-layer function entity determines a radio link state on the basis of whether indication information is received or not before the first timer times out;

the indication information may include at least one of the following information: In Sync (IS) indication information, beam recovery success indication information, the beam recovery failure indication information or Out of Sync (OoS) indication information.

In an embodiment, before the operation that the high-layer function entity determines the radio link state on the basis of whether the indication information is received or not before the first timer times out, the method may further include the following operations:

the high-layer function entity starts a second timer on the basis of the OoS indication information from a physical-layer function entity, the OoS indication information being used to indicate that a terminal cannot be synchronized with a network; and whether the first timer times out earlier than the second timer or not is determined.

In an embodiment, the operation that the high-layer function entity determines the radio link state on the basis of whether the indication information is received or not before the first timer times out may include the following operation:

before the first timer times out which is earlier than timing out of the second timer or before both the first timer and the second timer time out, the high-layer function entity determines the radio link state on the basis of whether the indication information is received or not.

In an embodiment, the first timer may be not set with a timing-out moment, or may be set with 0 or any numerical value as a timing-out moment.

In an embodiment, the operation that the high-layer function entity determines the radio link state on the basis of whether the indication information is received or not may include the following operations:

the high-layer function entity determines a Radio Link Failure (RLF), responsive to that a second preset amount of IS indication information is not received, the second preset amount being one or at least two; or the high-layer function entity determines that a radio link does not fail or indicates a physical layer to restart a beam failure recovery flow, responsive to that the second preset amount of IS indication information is received.

In an embodiment, the operation that the high-layer function entity determines the radio link state on the basis of whether the indication information is received or not may include the following operations:

the high-layer function entity determines a RLF, responsive to that a third preset amount of beam recovery success indication information is not received, the third preset amount being one or at least two; or the high-layer function entity determines that a radio link does not fail, responsive to that the third preset amount of beam recovery success indication information is received.

In an embodiment, the operation that the high-layer function entity determines the radio link state on the basis of whether the indication information is received or not may include the following operation:

the high-layer function entity determines a RLF, responsive to that a fourth preset amount of beam recovery failure indication information is received, the fourth preset amount being 0, one or at least two.

In an embodiment, the operation that the high-layer function entity determines the radio link state on the basis of whether the indication information is received or not may include the following operation:

the high-layer function entity determines a RLF, responsive to that a fifth preset amount of OoS indication information is received, the fifth preset amount being one or at least two.

In an embodiment, the method may further include the following operations:

the high-layer function entity determines a RLF, responsive to that a sixth preset amount of IS indication information is not received before the second timer times out which is earlier than timing out of the first timer or before both the first timer and the second timer time out, the sixth preset amount being one or at least two; or the high-layer function entity determines that a radio link does not fail or indicates a physical layer to restart a beam failure recovery flow, responsive to that the sixth preset amount of IS indication information is received before the second timer times out which is earlier than timing out of the first timer or before both the first timer and the second timer time out.

In an embodiment, the method may further include the following operation:

the high-layer function entity determines a RLF, responsive to that a seventh preset amount of beam recovery success indication information is not received before the second timer times out which is earlier than timing out of the first timer or before both the first timer and the second timer time out, the seventh preset amount being one or at least two.

In an embodiment, the method may further include the following operations:

the high-layer function entity determines that a radio link does not fail, responsive to that a seventh preset amount of beam recovery success indication information is received before the second timer times out which is earlier than timing out of the first timer or before both the first timer and the second timer time out, the seventh preset amount being one or at least two; or, the high-layer function entity determines a RLF, responsive to that an eighth preset amount of IS indication information is not received after a seventh preset amount of beam recovery success indication information is received and before the second timer times out which is earlier than timing out of the first timer or before both the first timer and the second timer time out, the eighth preset amount being one or at least two;

the high-layer function entity determines that a radio link does not fail, responsive to that the eighth preset amount of IS indication information is received.

In an embodiment, before the operation that the first timer is started, the method may further include the following operations:

the high-layer function entity configures the first timer; or,
the high-layer function entity obtains the first timer from a network device, the first timer being configured by the network device.

In an embodiment, the high-layer function entity may include a Radio Resource Control (RRC) function entity, a Packet Data Convergence Protocol (PDCP) function entity, a Radio Link Control (RLC) function entity or a Media Access Control (MAC) function entity.

The embodiments of the disclosure also provide a high-layer function entity, which may include a receiving unit and a first starting unit.

The receiving unit may be configured to receive a first preset amount of beam recovery failure indication information, the first preset amount being one or at least two.

The first starting unit may be configured to start a first timer on the basis of the first preset amount of beam recovery failure indication information received by the receiving unit.

In an embodiment, the high-layer function entity may further include a determination unit, configured to determine a radio link state on the basis of whether the receiving unit receives the indication information or not before the first timer times out, the indication information including at least one of the following information: IS indication information, beam recovery success indication information, the beam recovery failure indication information or OoS indication information.

In an embodiment, the high-layer function entity may further include a second starting unit.

The receiving unit may further be configured to receive OoS indication information from a physical-layer function entity, the OoS indication information being used to indicate that a terminal is unable to be synchronized with a network.

The second starting unit may be configured to start a second timer on the basis of the OoS indication information received by the receiving unit.

The determination unit may further be configured to determine whether the first timer times out earlier than the second timer or not.

In an embodiment, the determination unit may further be configured to, before the first timer times out which is earlier than timing out of the second timer or before both the first timer and the second timer time out, determine the radio link state on the basis of whether the receiving unit receives the indication information or not.

In an embodiment, the first timer may be not set with a timing-out moment, or may be set with 0 or any numerical value as a timing-out moment.

In an embodiment, the determination unit may be configured to: determine a RLF, responsive to that the receiving unit does not receive a second preset amount of IS indication information, the second preset amount being one or at least two; or determine that a radio link does not fail or indicate a physical layer to restart a beam failure recovery flow, responsive to that the receiving unit receives the second preset amount of IS indication information.

In an embodiment, the determination unit may be configured to: determine a RLF, responsive to that the receiving unit does not receive a third preset amount of beam recovery success indication information, the third preset amount being one or at least two; or determine that a radio link does not fail, responsive to that the receiving unit receives the third preset amount of beam recovery success indication information.

In an embodiment, the determination unit may be configured to determine a RLF, responsive to that the receiving unit receives a fourth preset amount of beam recovery failure indication information, the fourth preset amount being 0, one or at least two.

In an embodiment, the determination unit may be configured to determine a RLF, responsive to that the receiving unit receives a fifth preset amount of OoS indication information, the fifth preset amount being one or at least two.

In an embodiment, the determination unit may be configured to determine a RLF, responsive to that the receiving unit does not receive a sixth preset amount of IS indication information before the second timer times out which is earlier than timing out of the first timer or before both the first timer and the second timer time out, the sixth preset amount being one or at least two; or determine that a radio link does not fail or indicate a physical layer to restart a beam failure recovery flow, responsive to that the receiving unit receives the sixth preset amount of IS indication information before the second timer times out which is earlier than timing out of the first timer or before both the first timer and the second timer time out.

In an embodiment, the determination unit may be configured to determine a RLF, responsive to that the receiving unit does not receive a seventh preset amount of beam recovery success indication information before the second timer times out which is earlier than timing out of the first timer or before both the first timer and the second timer time out, the seventh preset amount being one or at least two.

In an embodiment, the determination unit may be configured to determine that a radio link does not fail, responsive to that the receiving unit receives a seventh preset amount of beam recovery success indication information before the second timer times out which is earlier than timing out of the first timer or before both the first timer and the second timer time out, the seventh preset amount being one or at least two; or, determine a RLF, responsive to that the receiving unit does not receive an eighth preset amount of IS indication information after the receiving unit receives a seventh preset amount of beam recovery success indication information and before the second timer times out which is earlier than timing out of the first timer or before both the first timer and the second timer time out, the eighth preset amount being one or at least two; or determine that a radio link does not fail when the receiving unit receives the eight preset amount of IS indication information.

In an embodiment, the high-layer function entity may further include a configuration unit to configure the first timer before the first starting unit starts the first timer; or, the receiving unit may be configured to obtain the first timer from a network device, the first timer being configured by the network device.

In an embodiment, the high-layer function entity may include an RRC function entity, a PDCP function entity, an RLC function entity or a MAC function entity.

The embodiments of the disclosure also provide a computer storage medium, in which a computer instruction may be stored, the instruction being executable by a processor to implement the steps of the information processing method of the embodiments of the disclosure.

The embodiments of the disclosure also provide a high-layer function entity, which may include a communication component configured for data transmission, a memory, a processor and a computer program stored in the memory and capable of running in the processor, the processor executing the program to implement the steps of the information processing method of the embodiments of the disclosure.

According to the information processing method and device and computer storage medium provided in the embodiments of the disclosure, the method includes that: the high-layer function entity receives a first preset amount of beam recovery failure indication information, and starts a first timer on the basis of the first preset amount of beam recovery failure indication information, the first preset amount being one or at least two. With adoption of the technical solutions of the embodiments of the disclosure, the high-layer function entity, when receiving the beam recovery failure indication information, starts the first timer, so that the high-layer function entity may determine a radio link state on the basis of whether signaling is received or not before the first timer times out.

DETAILED DESCRIPTION

The disclosure will further be described below in combination with the drawings and specific embodiments in detail.

Embodiment 1

Figure 1:
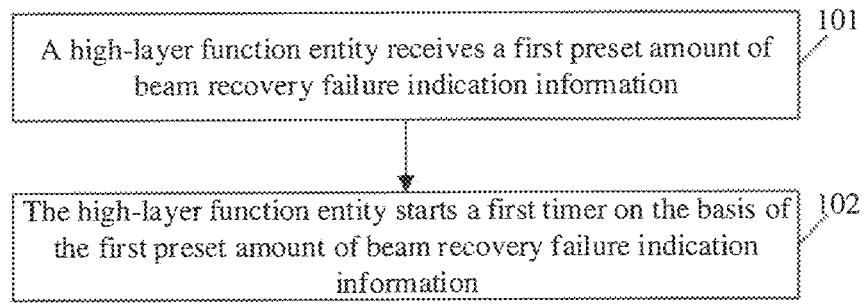
FIG. 1 is a flowchart of an information processing method according to embodiment 1 of the disclosure.

The embodiment of the disclosure provides an information processing method. FIG. 1 is a flowchart of an information processing method according to embodiment 1 of the disclosure. As shown in FIG. 1, the method includes the following steps.

In step 101, a high-layer function entity receives a first preset amount of beam recovery failure indication information, the first preset amount being one or at least two.

In step 102, the high-layer function entity starts a first timer on the basis of the first preset amount of beam recovery failure indication information.

The information processing method of the embodiment is applied to a terminal side. That is, the high-layer function entity of a terminal executes the information processing solution of the embodiment of the disclosure. Herein, the high-layer function entity includes an RRC function entity, a DPCP function entity, an RLC function entity or a MAC function entity.

In the embodiment, the high-layer function entity receives the first preset amount of beam recovery failure indication information from a physical-layer function entity. During a practical application, the physical-layer function entity, after failing to execute a beam recovery flow, sends the beam recovery failure indication information to the high-layer function entity.

In the embodiment, the first preset amount is one or at least two. That is, the first timer is started when one piece of beam recovery failure indication information is received, or the first timer is started when the amount of the received beam recovery failure indication information reaches at least two. For example, in a case that the first preset amount is 3, the first timer is started when the amount of the received beam recovery failure indication information reaches 3. Herein, the first preset amount may be preset by the high-layer function entity or determined on the basis of a signaling indication of a network device.

In the embodiment, before the operation that the first timer is started, the method may further include that: the high-layer function entity configures the first timer; or, the high-layer function entity obtains the first timer from the network device, the first timer being configured by the network device. It can be understood that the first timer is configured by the high-layer function entity or is configured by the network device, and then sent to the high-layer function entity.

As an implementation mode, the method may further include that: the high-layer function entity determines a radio link state on the basis of whether indication information is received or not before the first timer times out, the indication information including at least one of the following information: synchronization (In Sync, IS for short) indication information, beam recovery success indication information, beam recovery failure indication information, and Out of Sync (OoS) indication information. That is, the high-layer function entity determines that the radio link fails or that the radio link does not fail on the basis of whether the indication information is received or not before the first timer times out.

Figure 2A:
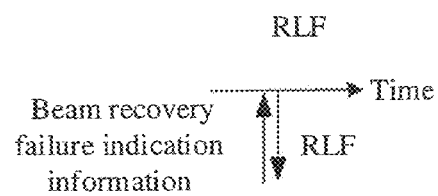
FIG. 2a to FIG. 2f are respectively application diagrams of the information processing method according to embodiment 1 of the disclosure.

Herein, the first timer is not set with a timing-out moment, or is set with 0 or any numerical value as a timing-out moment. When the first timer is not set with a timing-out moment or is set with 0 as a timing-out moment, it is indicated that the high-layer function entity may determine a RLF when the first preset amount of beam recovery failure indication information is received, specifically as shown in FIG. 2a. When the first timer is set with any numerical value except 0 as a timing-out moment, the radio link state may be determined on the basis of whether the indication information is received before the first timer times out.

Figure 2B:
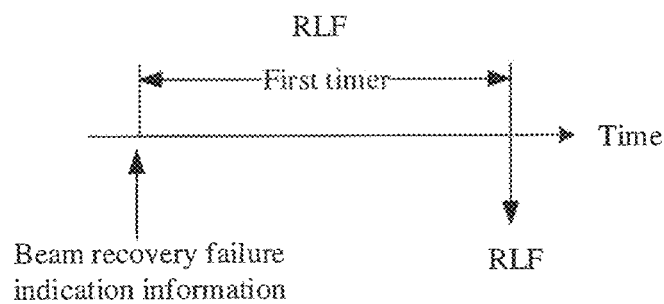
Figure 2C:
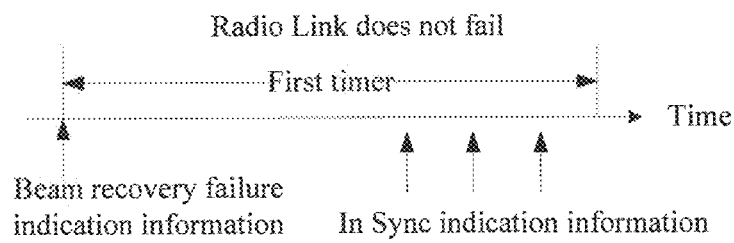
Figure 2D:
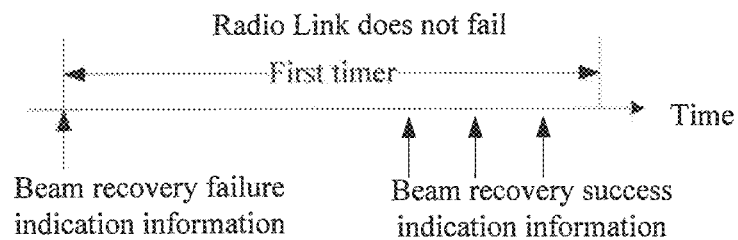

As a first implementation mode, in a case that the IS indication information (or the beam recovery success indication information) is not received or a second preset amount of IS indication information (or a third preset amount of beam recovery success indication information) is not received before the first timer times out, the high-layer function entity may determine a RLF, as shown in FIG. 2b, the second preset amount being one or at least two and the third preset amount being one or at least two. In a case that the second preset amount of IS indication information (or the third preset amount of beam recovery success indication information) is received before the first timer times out, assuming that the second preset amount (or the third preset amount) is 3, three pieces of IS indication information (or beam recovery success indication information) may be received before the first timer times out, and then it may be determined that the radio link does not fail, as shown in FIG. 2c and FIG. 2d.

Figure 2E:
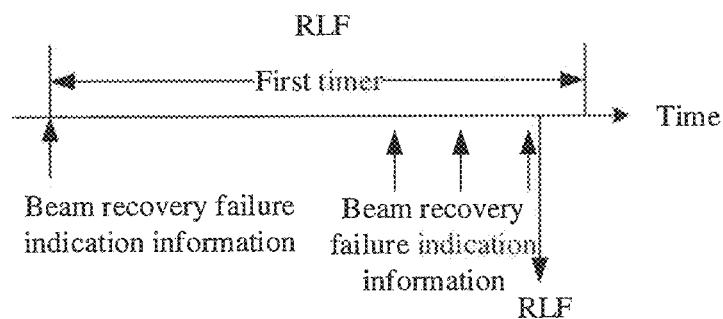
Figure 2F:
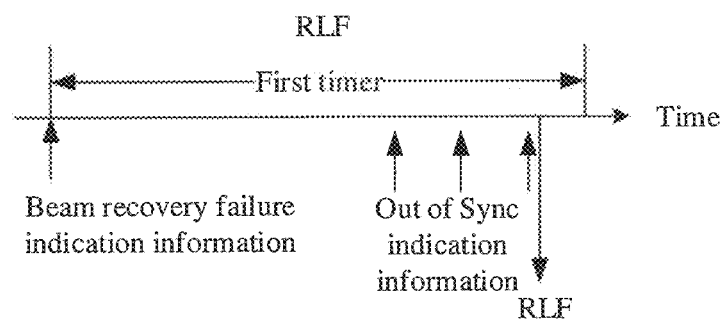

As a second implementation mode, when a fourth preset amount of beam recovery failure indication information is received before the first timer times out, the high-layer function entity may determine a RLF, the fourth preset amount being 0, one or at least two. Or, when a fifth preset amount of OoS indication information is received before the first timer times out, a RLF may be determined, the fifth preset amount being one or at least two. Specifically, as shown in FIG. 2e and FIG. 2f, for example, both of the fourth preset amount and the fifth preset amount are 3, three pieces of beam recovery failure indication information is received or three pieces of OoS indication information are received before the first timer times out, and then a RLF may be determined. Herein, in an application scenario that the fourth preset amount is 0, it can be understood that, when the first preset amount of beam recovery failure indication information is received, RLF may be determined by the high-layer function entity.

With adoption of the technical solution of the embodiment of the disclosure, the high-layer function entity, when receiving the beam recovery failure indication information, starts the first timer, so that the high-layer function entity may determine the radio link state on the basis of whether signaling is received before the first timer times out.

Embodiment 2

Figure 3:
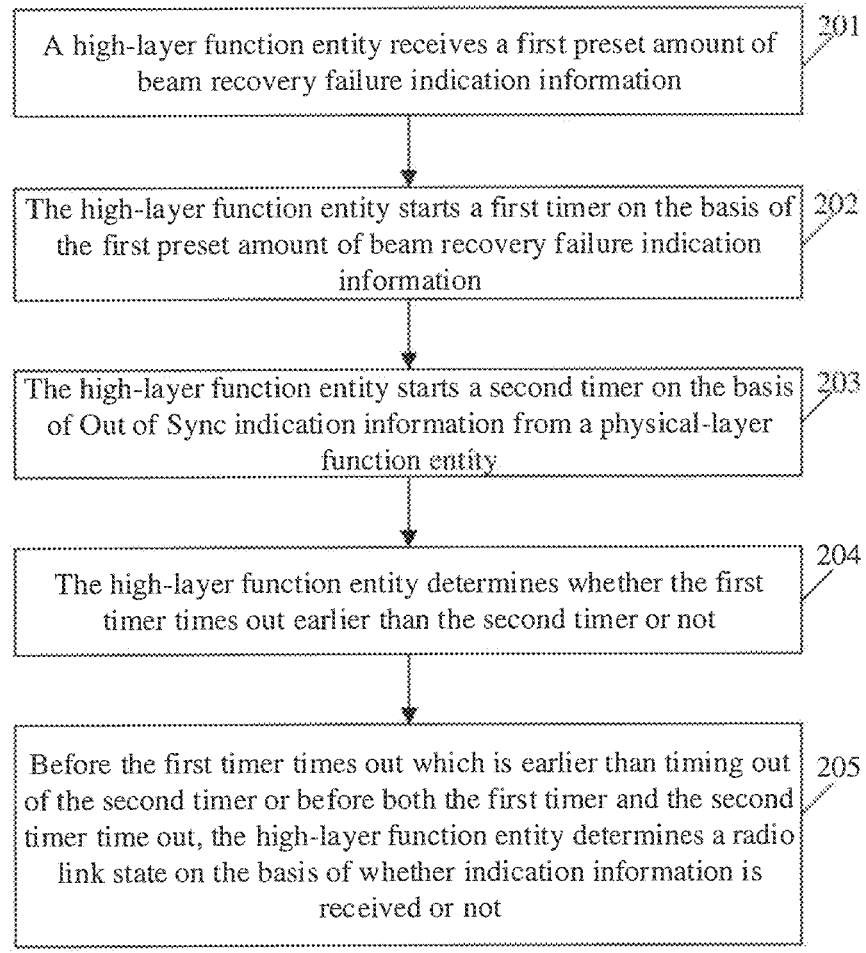
FIG. 3 is a flowchart of an information processing method according to embodiment 2 of the disclosure.

The embodiment of the disclosure provides an information processing method. FIG. 3 is a flowchart of an information processing method according to embodiment 2 of the disclosure. As shown in FIG. 3, the method includes the following steps.

In step 201, a high-layer function entity receives a first preset amount of beam recovery failure indication information, the first preset amount being one or at least two.

In step 202, the high-layer function entity starts a first timer on the basis of the first preset amount of beam recovery failure indication information.

In step 203, the high-layer function entity starts a second timer on the basis of OoS indication information from a physical-layer function entity, the OoS indication information being used to indicate that a terminal cannot be synchronized with a network.

In step 204, the high-layer function entity determines whether the first timer times out earlier than the second timer or not. In step 205, before the first timer times out which is earlier than timing out of the second timer or before both the first timer and the second timer time out, the high-layer function entity determines a radio link state on the basis of whether indication information is received or not.

The information processing method of the embodiment is applied to a terminal side. That is, the high-layer function entity of a terminal executes the information processing solution of the embodiment of the disclosure. Herein, the high-layer function entity may include an RRC function entity, a DPCP function entity, an RLC function entity or a MAC function entity.

In the embodiment, specific descriptions about Step 201 to Step 202 may refer to the specific descriptions about Step 101 to Step 102 in the abovementioned embodiment, and elaborations will not be repeated.

In the embodiment, the first timer is not set with a timing-out moment, or is set with 0 or any numerical value as a timing-out moment. When the first timer is not set with a timing-out moment or is set with 0 as a timing-out moment, it is indicated that the high-layer function entity may determine a RLF when the first preset amount of beam recovery failure indication information is received, specifically as shown in FIG. 2a. When the first timer is set with any numerical value except 0 as a timing-out moment, the radio link state may be determined on the basis of whether the indication information is received or not before the first timer times out.

In the embodiment, the high-layer function entity receives OoS indication information from a physical-layer function entity and starts the second timer on the basis of the OoS indication information. As an implementation mode, the high-layer function entity may receive the OoS indication information from the physical-layer function entity, and may start the second timer when the amount of the received OoS indication information reaches a preset amount, the preset amount being one or at least two. Herein, the second timer may be configured by the high-layer function entity or obtained by the high-layer function entity from a network device.

The embodiment is applied to two application scenarios. The first scenario is an application scenario that is before the first timer times out in a case that the first timer times out earlier than the second timer. The second scenario is a scenario that is before the timer which reaches a timing-out moment later times out, no matter whether the first timer times out earlier than the second timer or not. When the two scenarios are met, the high-layer function entity may determine the radio link state on the basis of whether the indication information is received or not, the indication information including at least one of the following information: IS indication information, beam recovery success indication information, beam recovery failure indication information and OoS indication information.

On the basis of the two scenarios, as a first implementation mode, the operation that the high-layer function entity determines the radio link state on the basis of whether the indication information is received or not may include that: when a second preset amount of IS indication information is not received, the high-layer function entity determines a RLF, the second preset amount being one or at least two; and when the second preset amount of IS indication information is received, the high-layer function entity determines that a radio link does not fail or indicates a physical layer to restart a beam failure recovery flow.

Figure 4A:
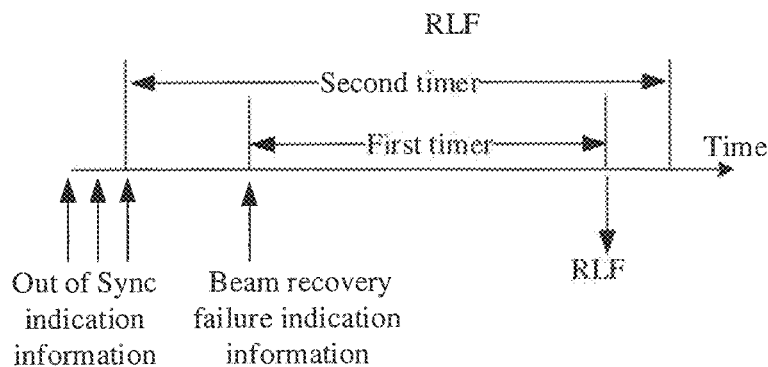
FIG. 4a to FIG. 4e are respectively application diagrams of the information processing method according to embodiment 2 of the disclosure.
Figure 4B:
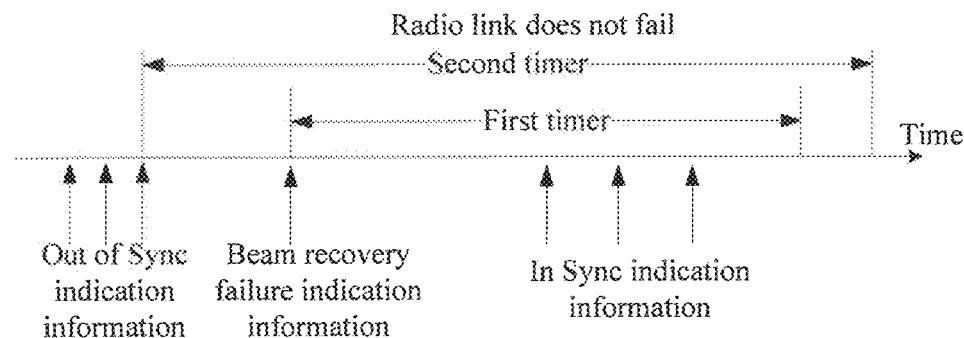

For example, the first timer times out earlier than the second timer, specifically as shown in FIG. 4a and FIG. 4b. When the beam recovery failure indication information is received, the high-layer function entity may start the first timer; and in a case that the IS indication information is not received or the second preset amount of IS indication information is not received before the first timer times out, a RLF may be determined, as shown in FIG. 4a. In a case that the second preset amount of IS indication information is received before the first timer times out, if the second preset amount is 3, three pieces of IS indication information may be received before the first timer times out, and then it may be determined that the radio link does not fail, as shown in FIG. 4b.

As a second implementation mode, the operation that the high-layer function entity determines the radio link state on the basis of whether the indication information is received or not may include that: if a third preset amount of beam recovery success indication information is not received, then the high-layer function entity may determine a RLF, the third preset amount being one or at least two; and if the third preset amount of beam recovery success indication information is received, then the high-layer function entity may determine that the radio link does not fail.

Figure 4C:
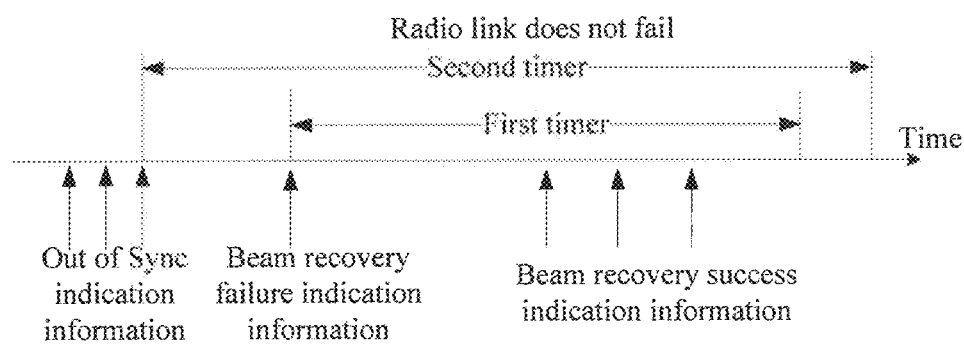

For example, the first timer times out earlier than the second timer, specifically as shown in FIG. 4a and FIG. 4c. In a cases that the high-layer function entity starts the first timer when the beam recovery failure indication information is received and that the beam recovery success indication information is not received or the third preset amount of beam recovery success indication information is not received before the first timer times out, a RLF may be determined, as shown in FIG. 4a. In a case that the third preset amount of beam recovery success indication information is received before the first timer times out, if the third preset amount is 3, three pieces of beam recovery success indication information may be received before the first timer times out, and then it may be determined that the radio link does not fail, as shown in FIG. 4c.

As a third implementation mode, the operation that the high-layer function entity determines the radio link state on the basis of whether the indication information is received or not may include that: when a fourth preset amount of beam recovery failure indication information is received, the high-layer function entity determines a RLF, the fourth preset amount being 0, one or at least two.

Figure 4D:
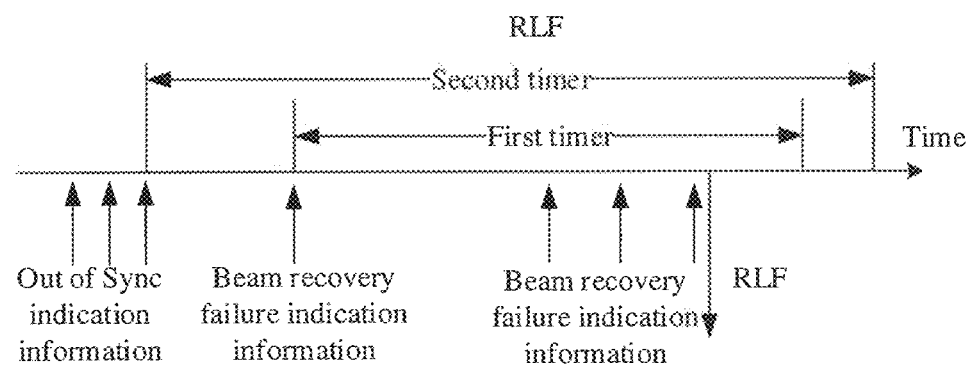

For example, the first timer times out earlier than the second timer, specifically as shown in FIG. 4d. In a case that the high-layer function entity starts the first timer when the beam recovery failure indication information is received and that the fourth preset amount of beam recovery failure indication information is received before the first timer times out, if the fourth preset amount is 3, three pieces of beam recovery failure indication information may be received before the first timer times out, a RLF may be determined.

As a fourth implementation mode, the operation that the high-layer function entity determines the radio link state on the basis of whether the indication information is received or not may include that: when a fifth preset amount of OoS indication information is received, the high-layer function entity may determine a RLF, the fifth preset amount being one or at least two.

Figure 4E:
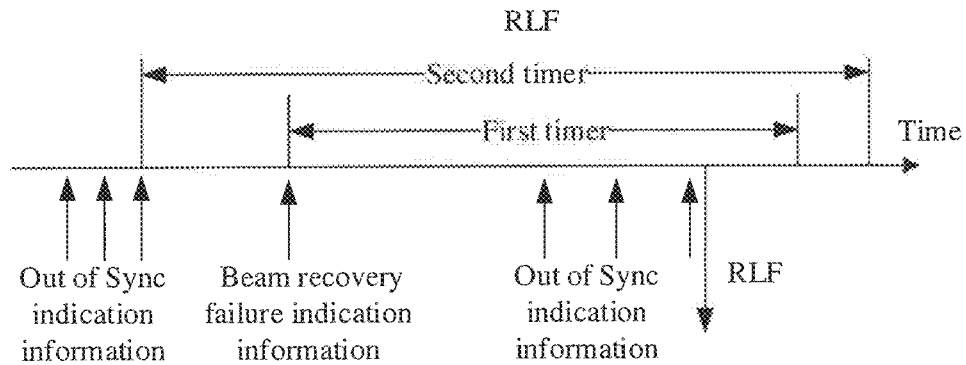

For example, the first timer times out earlier than the second timer, specifically as shown in FIG. 4e. In a case that the high-layer function entity starts the first timer when the beam recovery failure indication information is received and that the fifth preset amount of OoS indication information is received before the first timer times out, if the fifth preset amount is 3, three pieces of OoS indication information may be received before the first timer times out, a RLF may be determined.

In the embodiment, the first preset amount, the second preset amount, the third preset amount, the fourth preset amount and the fifth preset amount may be the same or different.

With adoption of the technical solution of the embodiment of the disclosure, the high-layer function entity starts the first timer when receiving the beam recovery failure indication information, so that the high-layer function entity may determine a radio link state on the basis of whether signaling is received before the first timer times out or before both the first timer and the second timer time out.

Embodiment 3

Figure 5:
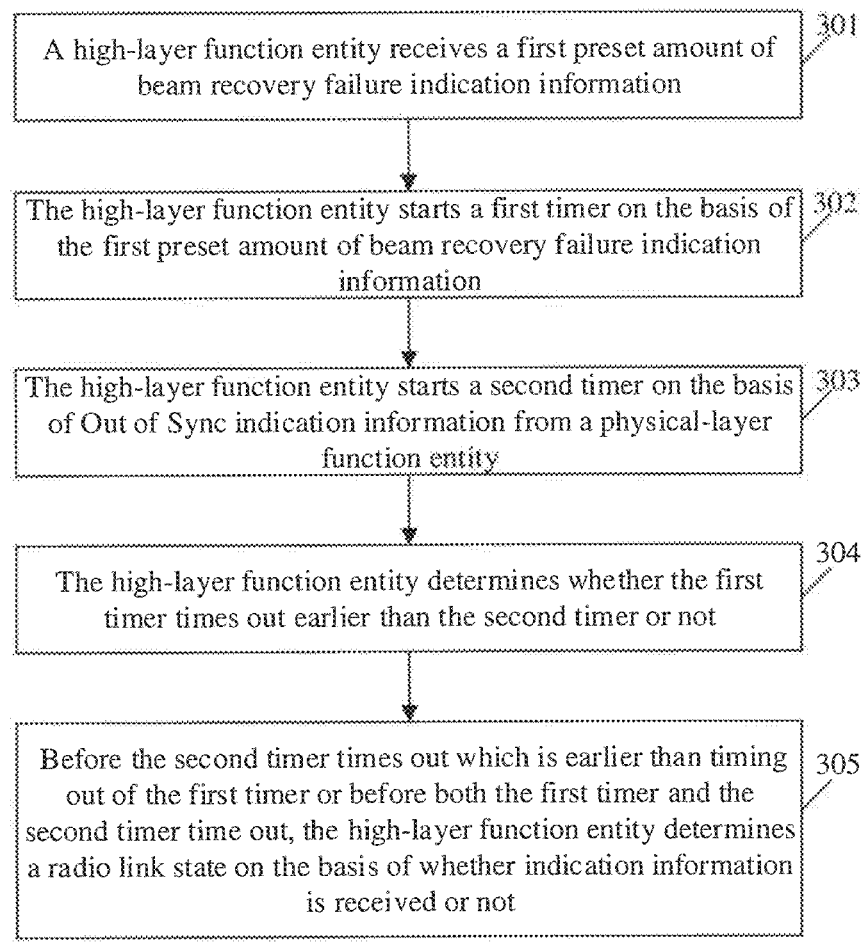
FIG. 5 is a flowchart of an information processing method according to embodiment 3 of the disclosure.

The embodiment of the disclosure provides an information processing method. FIG. 5 is a flowchart of an information processing method according to embodiment 3 of the disclosure. As shown in FIG. 5, the method includes the following steps.

In step 301, a high-layer function entity receives a first preset amount of beam recovery failure indication information, the first preset amount being one or at least two.

In step 302, the high-layer function entity starts a first timer on the basis of the first preset amount of beam recovery failure indication information.

In step 303, the high-layer function entity starts a second timer on the basis of OoS indication information coming from a physical-layer function entity, the OoS indication information being used to indicate that a terminal cannot be synchronized with a network.

In step 304, the high-layer function entity determines whether the first timer times out earlier than the second timer or not.

In step 305, before the second timer times out which is earlier than timing out of the first timer or before both the first timer and the second timer time out, the high-layer function entity determines a radio link state on the basis of whether indication information is received or not.

The information processing method of the embodiment is applied to a terminal side. That is, the high-layer function entity of a terminal executes the information processing solution of the embodiment of the disclosure. Herein, the high-layer function entity includes an RRC function entity, a DPCP function entity, an RLC function entity or a MAC function entity.

In the embodiment, specific descriptions about Step 301 to Step 304 may refer to the specific descriptions about Step 201 to Step 204 in the abovementioned embodiment, and elaborations will be not repeated.

The embodiment is applied to two application scenarios. The first scenario is an application scenario, i.e., before the second timer times out in a case that the second timer times out earlier than the first timer. The second scenario is a scenario, that is, before the timer which reaches a timing-out moment later times out, no matter whether the first timer times out earlier than the second timer or not. When the two scenarios are met, the high-layer function entity may determine a radio link state on the basis of whether the indication information is received or not, the indication information including at least one of the following information: IS indication information, beam recovery success indication information, beam recovery failure indication information and OoS indication information.

On the basis of the two scenarios, as a first implementation mode, if a sixth preset amount of IS indication information is not received, the high-layer function entity may determine a RLF, the sixth preset amount being one or at least two; and if the sixth preset amount of IS indication information is received, the high-layer function entity may determine that a radio link does not fail or may indicate a physical layer to restart a beam failure recovery flow.

Figure 6A:
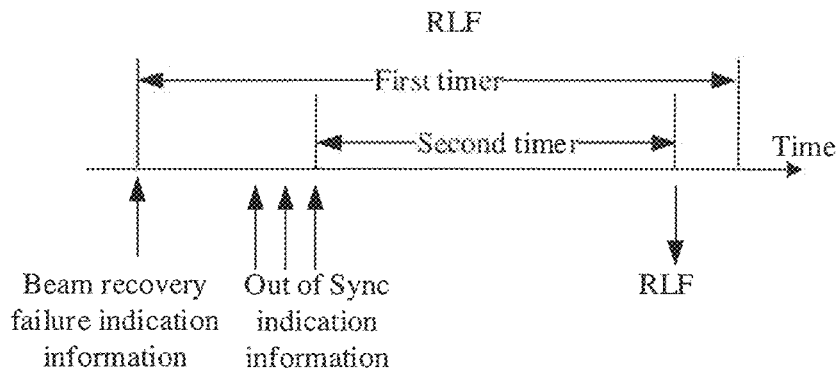
FIG. 6a to FIG. 6e are respectively application diagrams of the information processing method according to embodiment 3 of the disclosure.
Figure 6B:
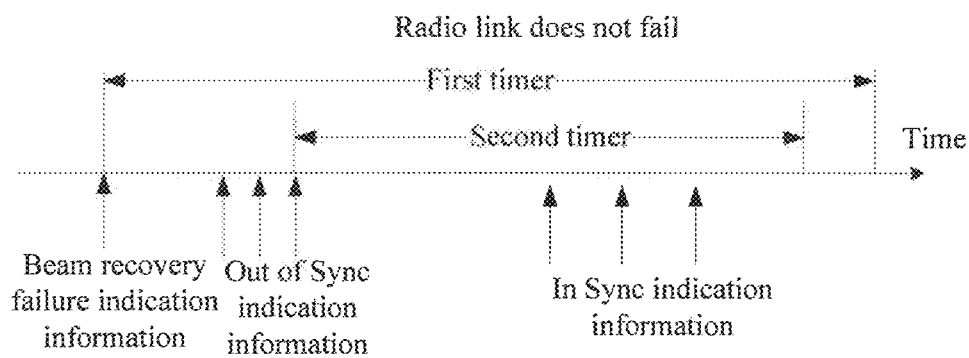

For example, the second timer times out earlier than the first timer, specifically as shown in FIG. 6a and FIG. 6b. In a case that the IS indication information is not received or the sixth preset amount of IS indication information is not received before the second timer times out, the RLF may be determined, as shown in FIG. 6a. When the sixth preset amount of IS indication information is received before the second timer times out, for example, if the sixth preset amount is 3, three pieces of IS indication information may be received before the second timer times out, and then the high-layer function entity may determine that the radio link does not fail, as shown in FIG. 6b. Or, when the sixth preset amount of IS indication information is received before the second timer times out, the high-layer function entity may indicate the physical-layer function entity to restart the beam failure recovery flow.

As a second implementation mode, in a case that a seventh preset amount of beam recovery success indication information is not received, the high-layer function entity may determine a RLF, the seventh preset amount being one or at least two.

For example, the second timer times out earlier than the first timer, specifically as shown in FIG. 6a. In a case that the beam recovery success indication information is not received or the seventh preset amount of beam recovery success indication information is not received before the second timer times out, the RLF may be determined.

As a third implementation mode, in a case that the seventh preset amount of beam recovery success indication information is received, the high-layer function entity may determine that the radio link does not fail, the seventh preset amount being one or at least two. Or, the high-layer function entity may determine a RLF in a case that an eighth preset amount of IS indication information is not received after the seventh preset amount of beam recovery success indication information is received and before the second timer times out which is earlier than timing out of the first timer or before both the first timer and the second timer time out, the eighth preset amount being one or at least two; and the high-layer function entity may determine that the radio link does not fail in a case that the eight preset amount of IS indication information is received.

Figure 6C:
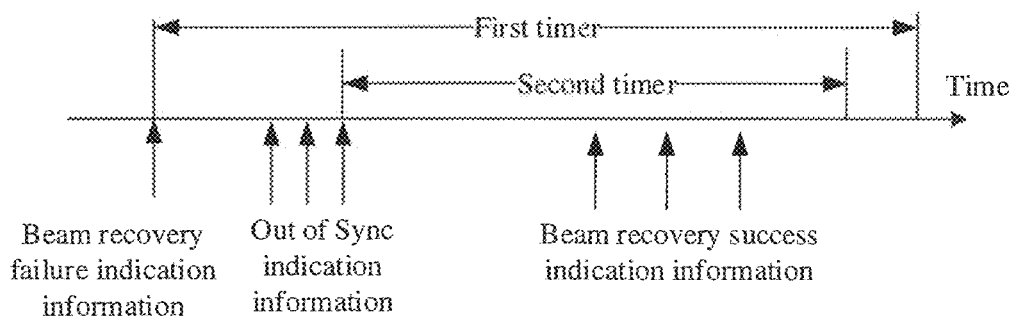
Figure 6D:
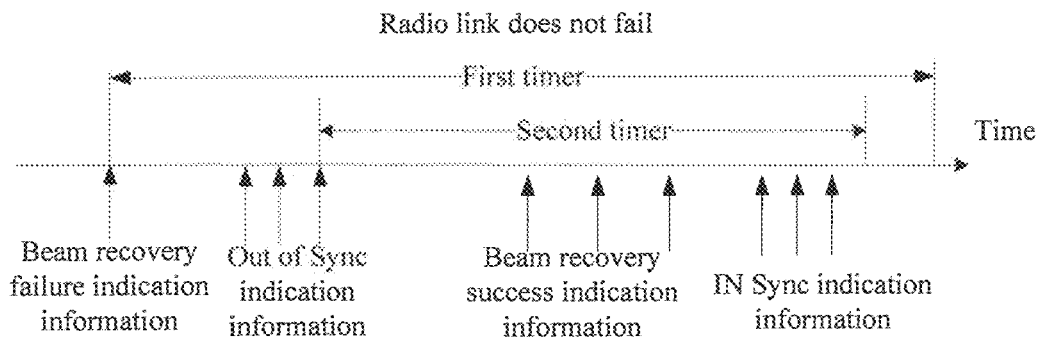

For example, the second timer times out earlier than the first timer. As a first implementation mode, for example, as shown in FIG. 6c, that the seventh preset amount of beam recovery success indication information is received before the second timer times out, the seventh preset amount being, for example, 3, in this case, three pieces of beam recovery success indication information may be received before the second timer times out, and then the high-layer function entity may determine that the radio link does not fail. As a second implementation mode, a RLF may be determined in a case that the eighth preset amount of IS indication information is not received after the seventh preset amount of beam recovery success indication information is received and before the second timer times out which is earlier than timing out of the first timer or before both the first timer and the second timer time out. The implementation mode may also refer to FIG. 6c. When the eighth preset amount of IS indication information is received, it may be determined that the radio link does not fail, and the implementation mode may refer to FIG. 6d.

As a fourth implementation mode, the operation that the high-layer function entity determines the radio link state on the basis of whether the indication information is received or not may include that: when a ninth preset amount of beam recovery failure indication information is received, the high-layer function entity may determine a RLF.

Figure 6E:
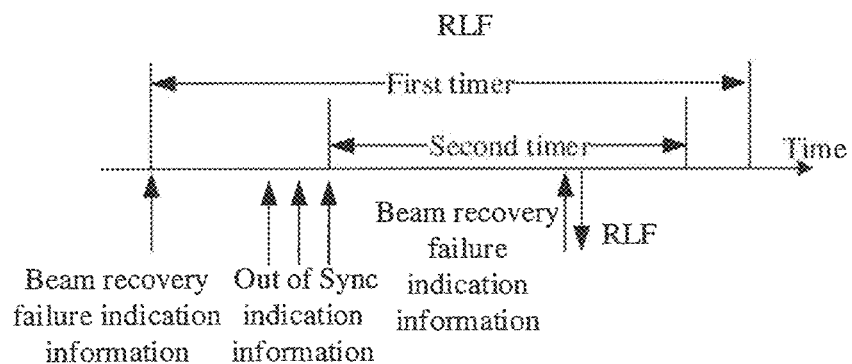

For example, the second timer times out earlier than the first timer, specifically as shown in FIG. 6e. In a case that the beam recovery failure indication information is received or the ninth preset amount of beam recovery failure indication information is received before the second timer times out, the RLF may be determined.

In the embodiment, the first preset amount, the sixth preset amount, the seventh preset amount, the eighth preset amount and the ninth preset amount may be the same or different.

With adoption of the technical solution of the embodiment of the disclosure, the high-layer function entity may start the first timer when receiving beam recovery failure indication information, and may start the second timer when receiving the OoS indication information, so that the high-layer function entity may determine the radio link state on the basis of whether signaling is received before the second timer times out or before both the first timer and the second timer time out.

Fourth Embodiment

Figure 7:
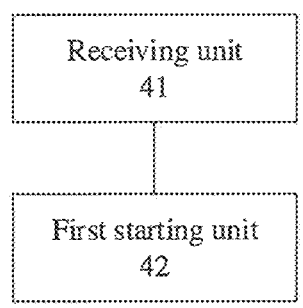
FIG. 7 is a first composition structure diagram of a high-layer function entity according to an embodiment of the disclosure.

The embodiment of the disclosure also provides a high-layer function entity. FIG. 7 is a first composition structure diagram of a high-layer function entity according to an embodiment of the disclosure. As shown in FIG. 7, the high-layer function entity includes a receiving unit 41 and a first starting unit 42.

The receiving unit 41 is configured to receive a first preset amount of beam recovery failure indication information, the first preset amount being one or at least two.

The first starting unit 42 is configured to start a first timer on the basis of the first preset amount of beam recovery failure indication information received by the receiving unit 41.

Figure 8:
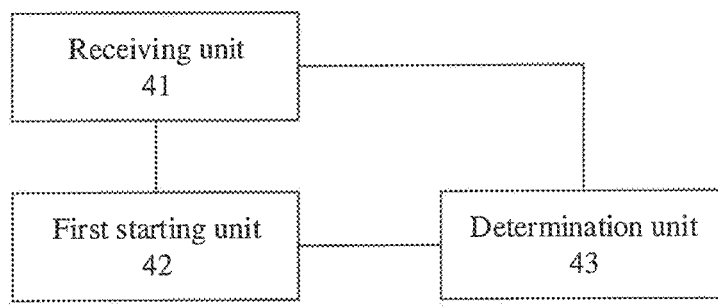
FIG. 8 is a second composition structure diagram of a high-layer function entity according to an embodiment of the disclosure.

As an implementation mode, FIG. 8 is a second composition structure diagram of a high-layer function entity according to an embodiment of the disclosure. As shown in FIG. 8, the high-layer function entity may further include a determination unit 43, configured to determine a radio link state on the basis of whether the receiving unit 41 receives the indication information or not before the first timer times out, the indication information including at least one of the following information: IS indication information, beam recovery success indication information, beam recovery failure indication information or OoS indication information.

Figure 9:
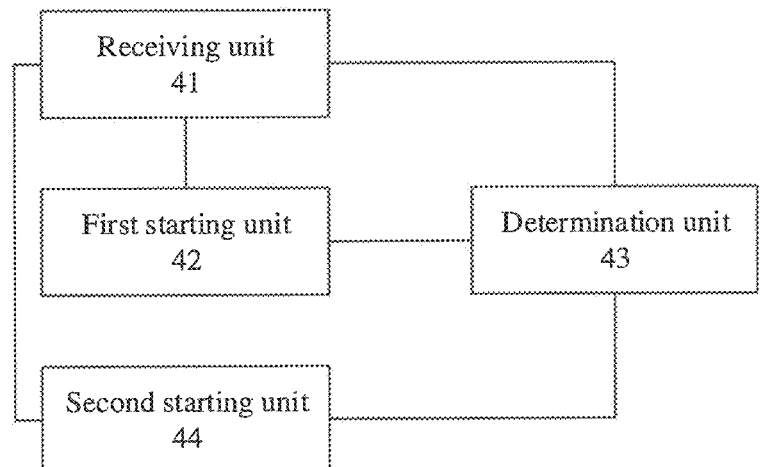
FIG. 9 is a third composition structure diagram of a high-layer function entity according to an embodiment of the disclosure.

As an implementation mode, FIG. 9 is a third composition structure diagram of a high-layer function entity according to an embodiment of the disclosure. As shown in FIG. 9, the high-layer function entity may further include a second starting unit 44.

The receiving unit 41 may be further configured to receive OoS indication information from a physical-layer function entity, the OoS indication information being used to indicate that a terminal cannot be synchronized with a network.

The second starting unit 44 may be configured to start a second timer on the basis of the preset OoS indication information received by the receiving unit 41.

The determination unit 43 may be further configured to determine whether the first timer times out earlier than the second timer or not.

Furthermore, the determination unit 43 may be further configured to, before the first timer times out which is earlier than timing out of the second timer or before both the first timer and the second timer time out, determine a radio link state on the basis of whether the receiving unit 41 receives the indication information or not.

Herein, the first timer may be not set with a timing-out moment, or may be set with 0 or any numerical value as a timing-out moment.

As a first implementation mode, the determination unit 43 may be configured to: when the receiving unit 41 does not receive a second preset amount of IS indication information, determine a RLF, the second preset amount being one or at least two; or when the receiving unit 41 receives the second preset amount of IS indication information, determine that a radio link does not fail or indicate a physical layer to restart a beam failure recovery flow.

As a second implementation mode, the determination unit 43 may be configured to: when the receiving unit 41 does not receive a third preset amount of beam recovery success indication information, determine the RLF, the third preset amount being one or at least two; or when the receiving unit 41 receives the third preset amount of beam recovery success indication information, determine that the radio link does not fail.

As a third implementation mode, the determination unit 43 may be configured to, when the receiving unit 41 receives a fourth preset amount of beam recovery failure indication information, determine the RLF, the fourth preset amount being 0, one or at least two.

As a fourth implementation mode, the determination unit 43 may be configured to, when the receiving unit 41 receives a fifth preset amount of OoS indication information, determine the RLF, the fifth preset amount being one or at least two.

As another implementation mode, the determination unit 43 may be further configured to, before the second timer times out which is earlier than timing out of the first timer or before both the first timer and the second timer time out, determine the radio link state on the basis of whether the receiving unit 41 receives the indication information or not.

As a first implementation mode, the determination unit 43 may be configured to: when the receiving unit 41 does not receive a sixth preset amount of IS indication information, determine the RLF, the sixth preset amount being one or at least two; or when the receiving unit 41 receives the sixth preset amount of IS indication information, determine that the radio link does not fail or indicate the physical layer to restart the beam failure recovery flow.

As a second implementation mode, the determination unit 43 may be configured to, when the receiving unit 41 does not receive a seventh preset amount of beam recovery success indication information, determine the RLF, the seventh preset amount being one or at least two.

As a third implementation mode, the determination unit 43 may be configured to, when the receiving unit 41 receives the seventh preset amount of beam recovery success indication information, determine that the radio link does not fail, the seventh preset amount being one or at least two; or, determine the RLF when the receiving unit 41 does not receive an eighth preset amount of IS indication information after the receiving unit 41 receives the seventh preset amount of beam recovery success indication information and before the second timer times out which is earlier than timing out of the first timer or before both the first timer and the second timer time out, the eighth preset amount being one or at least two; and determine that the radio link does not fail when the receiving unit 41 receives the eight preset amount of IS indication information.

As a fourth implementation mode, the determination unit 43 may be configured to, when the receiving unit 41 receives a ninth preset amount of beam recovery failure indication information, determine the RLF.

Figure 10:
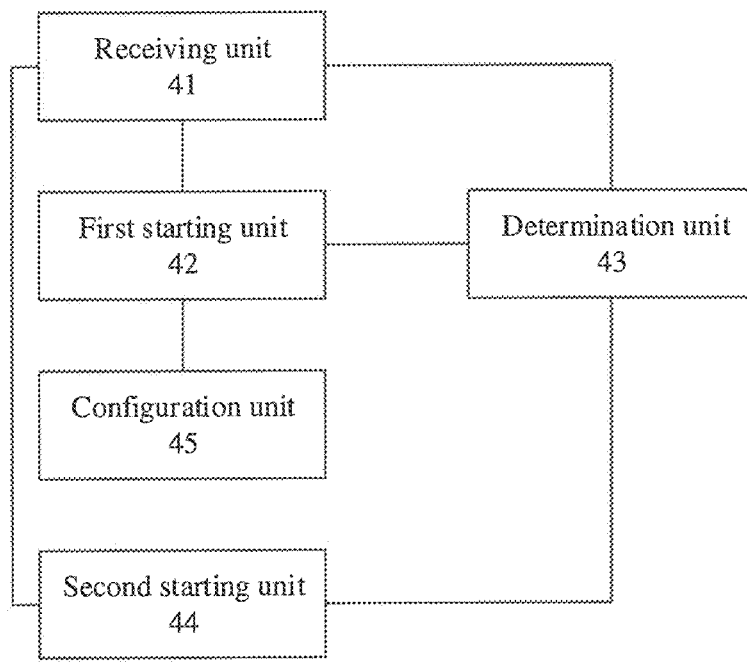
FIG. 10 is a fourth composition structure diagram of a high-layer function entity according to an embodiment of the disclosure.

FIG. 10 is a fourth composition structure diagram of a high-layer function entity according to an embodiment of the disclosure. As shown in FIG. 10, the high-layer function entity may further include a configuration unit 45, configured to configure the first timer before the first starting unit 42 starts the first timer; or, the receiving unit 41 may be configured to obtain the first timer from a network device, the first timer being configured by the network device.

In the embodiment of the disclosure, the high-layer function entity may include an RRC function entity, a PDCP function entity, an RLC function entity or a MAC function entity. During a practical application, all of the first starting unit 42, determination unit 43 and second starting unit 44 in the high-layer function entity may be implemented by a Central Processing Unit (CPU), a Digital Signal Processor (DSP), a Microcontroller Unit (MCU) or a Field-Programmable Gate Array (FPGA). During the practical application, the receiving unit 41 in the high-layer function entity may be implemented by a communication module (including an infrastructure communication suite, an operating system, a communication module, a standard interface, a protocol and the like) and a transceiver antenna. During the practical application, the configuration unit 45 in the high-layer function entity may be implemented by a CPU, a DSP, a MCU or a FPGA, or may be implemented by a communication module (including an infrastructure communication suite, an operating system, a communication module, a standard interface, a protocol and the like) and a transceiver antenna.

It is to be noted that the high-layer function entity provided in the embodiment is described with division of each of the abovementioned program modules as an example during information processing. In a practical application, such processing may be allocated to different program modules for completion according to a requirement, that is, an internal structure of the high-layer function entity may be divided into different program modules to complete all or part of abovementioned processing. In addition, the high-layer function entity provided in the embodiment adopts the same concept as the information processing method embodiment, and details about a specific implementation process thereof may refer to the method embodiment and will not be elaborated herein.

Fifth Embodiment

Figure 11:
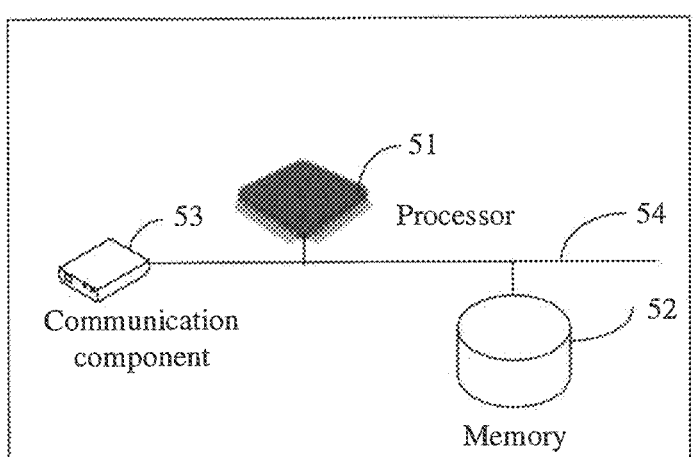
FIG. 11 is a hardware composition diagram of a high-layer function entity according to an embodiment of the disclosure.

The embodiment of the disclosure also provides a high-layer function entity, which includes an RRC function entity, a PDCP function entity, an RLC function entity or a MAC function entity. FIG. 11 is a hardware composition structure diagram of a high-layer function entity according to an embodiment of the disclosure. As shown in FIG. 11, a hardware structure of the high-layer function entity includes a communication component 53 configured for data transmission, at least one processor 51 and a memory 52 configured to store a computer program capable of running in the processor 51. Each component in the high-layer function entity is coupled together through a bus system 54. It can be understood that the bus system 54 is configured to implement connection and communication between these components. The bus system 54 includes a data bus and may further include a power bus, a control bus and a state signal bus. However, for clear description, various buses in FIG. 11 are marked as the bus system 54.

It can be understood that the memory 52 may be a volatile memory or a nonvolatile memory, and may also include both of the volatile and nonvolatile memories. Herein, the nonvolatile memory may be a Read Only Memory (ROM), a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a flash memory, a magnetic surface memory, a compact disc or a Compact Disc Read-Only Memory (CD-ROM). The magnetic surface memory may be a disk memory or a tape memory. The volatile memory may be a Random Access Memory (RAM), and may be used as an external high-speed cache. It is exemplarily but unlimitedly described that RAMs in various forms may be adopted, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM) and a Direct Rambus Random Access Memory (DRRAM). The memory 52 described in the embodiment of the disclosure is intended to include, but not limited to, memories of these and any other proper types.

The method described in the embodiment of the disclosure may be applied to the processor 51 or implemented by the processor 51. The processor 51 may be an integrated circuit chip with a signal processing capability. In an implementation process, each step of the method may be completed by an integrated logic circuit of hardware in the processor 51 or an instruction in a software form. The processor 51 may be a universal processor, a DSP or another Programmable Logic Device (PLD), a discrete gate or a transistor logic device, a discrete hardware component and the like. The processor 51 may implement or execute each method, step and logical block diagram disclosed in the embodiments of the disclosure. The universal processor may be a microprocessor, any conventional processor or the like. The steps of the method disclosed in combination with the embodiments of the disclosure may be directly be executed and completed by a hardware decoding processor or executed and completed by a combination of hardware and software modules in the decoding processor. The software module may be located in a storage medium, and the storage medium is located in the memory 52. The processor 51 reads information in the memory 52 and completes the steps of the method in combination with hardware.

In an exemplary embodiment, the terminal may be implemented by one or more Application Specific Integrated Circuits (ASICs), DSPs, PLDs, Complex Programmable Logic Devices (CPLDs), FPGAs, universal processors, controllers, MCUs, microprocessors or other electronic components, and is configured to execute the abovementioned method.

In the embodiment, the processor 51 may execute the program to implement the following operations: receiving a first preset amount of beam recovery failure indication information, and starting a first timer on the basis of the first preset amount of beam recovery failure indication information, the first preset amount being one or at least two.

As an implementation mode, the processor 51 may execute the program to implement the following operation: determining a radio link state on the basis of whether indication information is received or not before the first timer times out, the indication information including at least one of the following information: IS indication information, beam recovery success indication information, beam recovery failure indication information or OoS indication information.

As an implementation mode, the processor 51 may execute the program to implement the following operations: before determining the radio link state on the basis of whether the indication information is received or not before the first timer times out, starting a second timer on the basis of the OoS indication information from a physical-layer function entity, the OoS indication information being used to indicate that a terminal cannot be synchronized with a network; and determining whether the first timer times out earlier than the second timer or not.

As an implementation mode, the processor 51 may execute the program to implement the following operation: before the first timer times out which is earlier than timing out of the second timer or before both the first timer and the second timer time out, determining the radio link state on the basis of whether the indication information is received or not before the first timer times out.

Herein, the processor 51 may execute the program to implement the following operations: when a second preset amount of IS indication information is not received before the first timer times out or before both the first timer and the second timer time out, determining a RLF, the second preset amount being one or at least two, or when the second preset amount of IS indication information is received before the first timer times out or before both the first timer and the second timer time out, determining that a radio link does not fail or indicating a physical layer to restart a beam failure recovery flow.

Herein, the processor 51 may execute the program to implement the following operations: determining the RLF in a case that a third preset amount of beam recovery success indication information is not received before the first timer times out or before both the first timer and the second timer time out, the third preset amount being one or at least two; or determining that the radio link does not fail in a case that the third preset amount of beam recovery success indication information is received before the first timer times out or before both the first timer and the second timer time out.

Herein, the processor 51 may execute the program to implement the following operation: determining the RLF in a case that a fourth preset amount of beam recovery failure indication information is received before the first timer times out or before both the first timer and the second timer time out, the fourth preset amount being 0, one or at least two.

Herein, the processor 51 may execute the program to implement the following operation: determining the RLF in a case that a fifth preset amount of OoS indication information is received before the first timer times out or before both the first timer and the second timer time out, the fifth preset amount being one or at least two.

Herein, the processor 51 may execute the program to implement the following operation: before the second timer times out which is earlier than timing out of the first timer or before both the first timer and the second timer time out, determining the radio link state on the basis of whether the indication information is received or not.

Herein, the processor 51 may execute the program to implement the following operations: determining the RLF in a case that a sixth preset amount of IS indication information is not received before the second timer times out which is earlier than timing out of the first timer or before both the first timer and the second timer time out, the sixth preset amount being one or at least two; or determining that the radio link does not fail or indicating the physical layer to restart the beam failure recovery flow in a case that the sixth preset amount of IS indication information is received before the second timer times out which is earlier than timing out of the first timer or before both the first timer and the second timer time out.

Herein, the processor 51 may execute the program to implement the following operation: determining the RLF in a case that a seventh preset amount of beam recovery success indication information is not received before the second timer times out which is earlier than timing out of the first timer or before both the first timer and the second timer time out, the seventh preset amount being one or at least two.

Herein, the processor 51 may execute the program to implement the following operations: determining the RLF in a case that the seventh preset amount of beam recovery success indication information is received before the second timer times out which is earlier than timing out of the first timer or before both the first timer and the second timer time out, the seventh preset amount being one or at least two; or, determining the RLF in a case that an eighth preset amount of IS indication information is not received after the seventh preset amount of beam recovery success indication information is received and before the second timer times out which is earlier than timing out of the first timer or before both the first timer and the second timer time out, the eighth preset amount being one or at least two, or determining that the radio link does not fail in a case that the eighth preset amount of IS indication information is received.

As an implementation mode, the processor 51 may execute the program to implement the following operations: configuring the first timer before starting the first timer; or, obtaining the first timer from a network device, the first timer being configured by the network device.

Sixth Embodiment

The embodiment of the disclosure also provides a computer-readable storage medium, which includes, for example, a memory 52 having stored a computer program, as shown in FIG. 11. The computer program may be executed by a processor 51 of a terminal to implement the steps of the method. The computer-readable storage medium may be a memory such as a Ferroelectric Random Access Memory (FRAM), a ROM, a PROM, an EPROM, an EEPROM, a flash memory, a magnetic surface memory, a compact disc or a CD-ROM, and may also be any device including one or any combination of these memories, for example, a mobile phone, a computer, a tablet and a personal digital assistant.

The computer-readable storage medium is provided according to the embodiment of the disclosure, which has a computer program stored thereon. The computer program when run by the processor is capable of executing the following operations: receiving a first preset amount of beam recovery failure indication information, and starting a first timer on the basis of the first preset amount of beam recovery failure indication information, the first preset amount being one or at least two.

As an implementation mode, the computer program when run by the processor may be further configured to execute the following operation: determining a radio link state on the basis of whether indication information is received or not before the first timer times out, the indication information including at least one of the following information: IS indication information, beam recovery success indication information, beam recovery failure indication information or OoS indication information.

As an implementation mode, the computer program when run by the processor may be further configured to execute the following operations: before determining the radio link state on the basis of whether the indication information is received or not before the first timer times out, starting a second timer on the basis of the OoS indication information from a physical-layer function entity, the OoS indication information being used to indicate that a terminal cannot be synchronized with a network; and determining whether the first timer times out earlier than the second timer or not.

As an implementation mode, the computer program when run by the processor may be further configured to execute the following operation: before the first timer times out which is earlier than timing out of the second timer or before both the first timer and the second timer time out, determining the radio link state on the basis of whether the indication information is received or not before the first timer times out.

Herein, the computer program when run by the processor is configured to execute the following operations: determining a RLF in a case that a second preset amount of IS indication information is not received before the first timer times out or before both the first timer and the second timer time out, the second preset amount being one or at least two; or determining that a radio link does not fail or indicating a physical layer to restart a beam failure recovery flow in a case that the second preset amount of IS indication information is received before the first timer times out or before both the first timer and the second timer time out.

Herein, the computer program when run by the processor is configured to execute the following operations: determining a RLF in a case that a third preset amount of beam recovery success indication information is not received before the first timer times out or before both the first timer and the second timer time out, the third preset amount being one or at least two; or determining that the radio link does not fail in a case that the third preset amount of beam recovery success indication information is received before the first timer times out or before both the first timer and the second timer time out.

Herein, the computer program when run by the processor is configured to execute the following operation: determining a RLF in a case that a fourth preset amount of beam recovery failure indication information is received before the first timer times out or before both the first timer and the second timer time out, the fourth preset amount being 0, one or at least two.

Herein, the computer program when run by the processor is configured to execute the following operation: determining a RLF in a case that a fifth preset amount of OoS indication information is received before the first timer times out or before both the first timer and the second timer time out, the fifth preset amount being one or at least two.

Herein, the computer program when run by the processor is configured to execute the following operation: before the second timer times out which is earlier than timing out of the first timer or before both the first timer and the second timer time out, determining the radio link state on the basis of whether the indication information is received or not.

Herein, the computer program when run by the processor is configured to execute the following operations: determining a RLF in a case that a sixth preset amount of IS indication information is not received before the second timer times out which is earlier than timing out of the first timer or before both the first timer and the second timer time out, the sixth preset amount being one or at least two; or determining that the radio link does not fail or indicating the physical layer to restart the beam failure recovery flow in a case that the sixth preset amount of IS indication information is received before the second timer times out which is earlier than timing out of the first timer or before both the first timer and the second timer time out.

Herein, the computer program when run by the processor is configured to execute the following operation: determining a RLF in a case that a seventh preset amount of beam recovery success indication information is not received before the second timer times out which is earlier than timing out of the first timer or before both the first timer and the second timer time out, the seventh preset amount being one or at least two.

Herein, the computer program when run by the processor is configured to execute the following operations: determining a RLF in a case that the seventh preset amount of beam recovery success indication information is received before the second timer times out which is earlier than timing out of the first timer or before both the first timer and the second timer time out, the seventh preset amount being one or at least two; or, determining a RLF in a case that after the seventh preset amount of beam recovery success indication information is received, an eighth preset amount of IS indication information is not received before the second timer times out which is earlier than timing out of the first timer or before both the first timer and the second timer time out, the eighth preset amount being one or at least two, or determining that the radio link does not fail if the eighth preset amount of IS indication information is received.

As an implementation mode, the computer program when run by the processor is configured to further execute the following operations: configuring the first timer before starting the first timer; or, obtaining the first timer from a network device, the first timer being configured by the network device.

In some embodiments provided by the application, it is to be understood that the described high-layer function entity and method may be implemented in other manners. The high-layer function entity embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part of or all of the units may be selected according to a practical requirement to achieve the purposes of the solutions of the embodiments.

In addition, each functional unit in each embodiment of the disclosure may be integrated into a processing unit, each unit may also serve as an independent unit and two or more than two units may also be integrated into a unit. The integrated unit may be implemented in a hardware form or in form of hardware and software functional unit.

Those of ordinary skill in the art should know that all or part of the steps of the method embodiments may be implemented by related hardware instructed through a program, the program may be stored in a computer-readable storage medium, and the program is executable to execute the steps of the method embodiments. The storage medium may include various media capable of storing program codes, such as a mobile storage device, a ROM, a RAM, a magnetic disk or a compact disc.

Or, when being implemented in form of software functional module and sold or used as an independent product, the integrated unit of the disclosure may also be stored in a computer-readable storage medium. Based on such an understanding, the technical solutions of the embodiments of the disclosure substantially or parts making contributions to the conventional art may be embodied in form of software product, and the computer software product may be stored in a storage medium, including a plurality of instructions configured to enable a computer device (which may be a personal computer, a server, a network device or the like) to execute all or part of the method in each embodiment of the disclosure. The storage medium may include various media capable of storing program codes, such as a mobile hard disk, a ROM, a RAM, a magnetic disk or a compact disc.

The above are only the specific implementation modes of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for information processing, comprising:
   receiving, by a high-layer function entity, a first preset amount of beam recovery failure indication information; and
   starting a first timer on the basis of the first preset amount of beam recovery failure indication information, the first preset amount being one,
   wherein when the first timer is not set with a timing-out moment, the high-layer function entity determines a radio link failure (RLF) when the first preset amount of beam recovery failure indication information is received;
   when the first timer is set with any other value than 0 as a timing-out moment, determining, by the high-layer function entity, a radio link state on the basis of whether indication information is received or not before the first timer times out, wherein the indication information comprises at least one of following information: In Sync (IS) indication information, beam recovery success indication information, the beam recovery failure indication information, or Out of Sync (OoS) indication information;

before determining, by the high-layer function entity, the radio link state on the basis of whether the indication information is received or not before the first timer times out, the method further comprising:

starting, by the high-layer function entity, a second timer on the basis of OoS indication information from a physical-layer function entity, the OoS indication information being used to indicate that a terminal is unable to be synchronized with a network; and determining, by the high-layer function entity, whether the first timer times out earlier than the second timer or not.

2. The method of claim 1, wherein determining, by the high-layer function entity, the radio link state on the basis of whether the indication information is received or not before the first timer times out comprises:

determining, by the high-layer function entity, the radio link state on the basis of whether the indication information is received or not before the first timer times out which is earlier than timing out of the second timer or before both the first timer and the second timer time out.

3. The method of claim 2, wherein determining, by the high-layer function entity, the radio link state on the basis of whether the indication information is received or not comprises:

determining, by the high-layer function entity, a Radio Link Failure (RLF), responsive to that a second preset amount of IS indication information is not received, the second preset amount being one or at least two; or determining, by the high-layer function entity, that a radio link does not fail or indicating a physical layer to restart a beam failure recovery flow, responsive to that the second preset amount of IS indication information is received; or, determining, by the high-layer function entity, a RLF, responsive to that a third preset amount of beam recovery success indication information is not received, the third preset amount being one or at least two; or determining, by the high-layer function entity, that a radio link does not fail, responsive to that the third preset amount of beam recovery success indication information is received; or, determining, by the high-layer function entity, a RLF, responsive to that a fourth preset amount of beam recovery failure indication information is received, the fourth preset amount being 0, one or at least two; or, determining, by the high-layer function entity, a RLF, responsive to that a fifth preset amount of OoS indication information is received, the fifth preset amount being one or at least two.

4. The method of claim 1, wherein the first timer is set with 0 or any numerical value as a timing-out moment.

5. The method of claim 1, further comprising:

determining, by the high-layer function entity, the radio link state on the basis of whether the indication information is received or not before the second timer times out which is earlier than timing out of the first timer or before both the first timer and the second timer time out.

6. The method of claim 5, wherein determining, by the high-layer function entity, the radio link state on the basis of whether the indication information is received or not comprises:

determining, by the high-layer function entity, a RLF, responsive to that a sixth preset amount of IS indication information is not received, the sixth preset amount being one or at least two; or determining, by the high-layer function entity, that a radio link does not fail or indicating a physical layer to restart a beam failure recovery flow, responsive to that the sixth preset amount of IS indication information is received; or, determining, by the high-layer function entity, a RLF, responsive to that a seventh preset amount of beam recovery success indication information is not received, the seventh preset amount being one or at least two; or, determining, by the high-layer function entity, that a radio link does not fail, responsive to that a seventh preset amount of beam recovery success indication information is received, the seventh preset amount being one or at least two; or, determining, by the high-layer function entity, a RLF, responsive to that an eighth preset amount of IS indication information is not received after a seventh preset amount of beam recovery success indication information is received and before the second timer times out which is earlier than timing out of the first timer or before both the first timer and the second timer time out, the eighth preset amount being one or at least two; and determining that a radio link does not fail, responsive to that the eighth preset amount of IS indication information is received; or, determining, by the high-layer function entity, a RLF, responsive to that a ninth preset amount of beam recovery failure indication information is received.

7. A high-layer function entity, comprising a communication component and a processor, wherein the communication component is configured to receive a first preset amount of beam recovery failure indication information, the first preset amount being one; and the processor is configured to start a first timer on the basis of the first preset amount of beam recovery failure indication information received by the communication component, wherein when the first timer is not set with a timing-out moment, the high-layer function entity determines a radio link failure (RLF) when the first preset amount of beam recovery failure indication information is received;

wherein the processor is further configured to, when the first timer is set with any other value than 0 as a timing-out moment, determine a radio link state on the basis of whether the communication component receives the indication information or not before the first timer times out, wherein the indication information comprises at least one of following information: In Sync (IS) indication information, beam recovery success indication information, the beam recovery failure indication information, or Out of Sync (OoS) indication information;

wherein the communication component is further configured to receive OoS indication information from a physical-layer function entity, the OoS indication information being used to indicate that a terminal is unable to be synchronized with a network;

wherein the processor is further configured to start a second timer on the basis of the OoS indication information received by the communication component, and determine whether the first timer times out earlier than the second timer or not.

8. The high-layer function entity of claim 7, wherein the processor is further configured to determine the radio link state on the basis of whether the communication component receives the indication information or not before the first timer times out which is earlier than timing out of the second timer or before both the first timer and the second timer time out.

9. The high-layer function entity of claim 8, wherein the processor is further configured to:

determine a Radio Link Failure (RLF), responsive to that the communication component does not receive a second preset amount of IS indication information, the second preset amount being one or at least two; or determine that a radio link does not fail or indicate a physical layer to restart a beam failure recovery flow, responsive to that the communication component receives the second preset amount of IS indication information; or determine a RLF, responsive to that the communication component does not receive a third preset amount of beam recovery success indication information, the third preset amount being one or at least two, and is further configured to determine that a radio link does not fail, responsive to that the communication component receives the third preset amount of beam recovery success indication information; or determine a RLF, responsive to that the communication component receives a fourth preset amount of beam recovery failure indication information, the fourth preset amount being 0, one or at least two; or determine a RLF, responsive to that the communication component receives a fifth preset amount of OoS indication information, the fifth preset amount being one or at least two.

10. The high-layer function entity of claim 7, wherein the first timer is set with 0 or any numerical value as a timing-out moment.

11. The high-layer function entity of claim 8, wherein the processor is further configured to determine a radio link state on the basis of whether the communication component receives the indication information or not before the second timer times out which is earlier than timing out of the first timer or before both the first timer and the second timer time out.

12. The high-layer function entity of claim 11, wherein the processor is further configured to:

determine a RLF, responsive to that the communication component does not receive a sixth preset amount of IS indication information, the sixth preset amount being one or at least two; or determine that a radio link does not fail or indicate a physical layer to restart a beam failure recovery flow, responsive to that the communication component receives the sixth preset amount of IS indication information; or determine a RLF, responsive to that the communication component does not receive a seventh preset amount of beam recovery success indication information, the seventh preset amount being one or at least two; or determine that a radio link does not fail, responsive to that the communication component receives a seventh preset amount of beam recovery success indication information, the seventh preset amount being one or at least two; or, determine a RLF, responsive to that the communication component does not receive an eighth preset amount of IS indication information after the communication component receives a seventh preset amount of beam recovery success indication information and before the second timer times out which is earlier than timing out of the first timer or before both the first timer and the second timer time out, the eighth preset amount being one or at least two; or determine that a radio link does not fail, responsive to that the communication component receives the eight preset amount of IS indication information; or determine a RLF, responsive to that the communication component receives a ninth preset amount of beam recovery failure indication information.

13. The high-layer function entity of claim 7, wherein the processor is further configured to, before the first timer is started, configure the first timer; or, the communication component is further configured to obtain the first timer from a network device, the first timer being configured by the network device.

14. The high-layer function entity of claim 7, wherein the high-layer function entity comprises a Radio Resource Control (RRC) function entity, a Packet Data Convergence Protocol (PDCP) function entity, a Radio Link Control (RLC) function entity or a Media Access Control (MAC) function entity.

* * * * *